United States Patent [19]

Tymon et al.

[11] Patent Number: 4,956,121
[45] Date of Patent: Sep. 11, 1990

[54] DIMETHYLACETAMIDE MICA AND VERMICULITE SUSPENSIONS

[75] Inventors: Thomas M. Tymon, Millersville, Pa.; Albin F. Turbak, Sandy Springs, Ga.

[73] Assignee: Armstrong World Industries, Inc., Lancaster, Pa.

[21] Appl. No.: 296,954

[22] Filed: Jan. 17, 1989

[51] Int. Cl.$^5$ ...................... C04B 33/02; C04B 20/02
[52] U.S. Cl. ............................... 252/378 R; 501/148; 106/417; 106/483; 106/DIG. 3
[58] Field of Search ................... 252/378 R; 104/417, 104/483, DIG. 3; 501/148

[56] References Cited

U.S. PATENT DOCUMENTS

| 3,325,340 | 6/1967 | Walker | 252/378 R |
| 4,777,206 | 10/1988 | Rittler | 501/148 |
| 4,800,041 | 1/1989 | Tymon et al. | 252/378 R |

FOREIGN PATENT DOCUMENTS 276170  1/1966  Australia .

Primary Examiner—Mark L. Bell
Assistant Examiner—David M. Brunsman

[57] ABSTRACT

Chemically prepared mica and vermiculite materials are described along with the method for preparing them. The mica and vermiculite has dimethylacetamide-lithium chelation complexes at interlayer cationic sites. These materials can be made into suspensions and flocculated.

18 Claims, No Drawings

DIMETHYLACETAMIDE MICA AND VERMICULITE SUSPENSIONS

The present invention concerns the phyllosilicates, mica and vermiculite, also known as 2:1 layered silicates. These materials are widely used in many different applications due to their heat and fire resistant nature. Suspensions of mica and vermiculite can be used to prepare paper, films, boards, and even to put protective coatings on less flame resistant items.

Thus, suspensions of mica and vermiculite are valuable as the raw material for a variety of uses and items made with these minerals. Present methods for the preparation of vermiculite suspensions include the methods described in U.S. Pat. Nos. 3,328,340 and 3,356,611. Methods for the preparation of mica suspensions are described in U.S. Pat. Nos. 4,432,852; 4,239,519; and 4,416,517. Such methods, however, use exchange cations such as lithium, sodium, and n-butylammonium to swell and disperse the silicate. All of these methods require or strongly prefer the use of water for the preparation of the suspension.

Present methods for the preparation of suspensions of both mica and vermiculite use ion exchange and are largely directed to aqueous systems. While water does provide an extremely versatile and preferable liquid system for mica and vermiculite suspensions, it would be advantageous to have available particular materials selected from mica and vermiculite which are capable of dispersing in other solvent systems in addition to water. This would allow solvent systems to be changed, while still using the same vermiculite and mica solids.

Compositions are accordingly described herein which are capable of dispersing both in water and in particular aqueous and non-aqueous liquid systems. The instant mica and vermiculite compositions are thus more versatile. These compositions would also be suitable for such applications as viscosity modification, lubrication, and especially for combination with other compositions which would not be compatible with water.

SUMMARY OF THE INVENTION

The layered silicates either natural or synthetic, having lithium as an interlayer cation and which are selected from the group consisting of mica and vermiculite can be contacted with dimethylacetamide to form compositions of mica and vermiculite having a dimethylacetamide-lithium interlayer chelation complex. These compositions not only can be used for water systems but, also can be used to provide suspensions in both water-containing and non-aqueous solvent systems which can be used where water would not be tolerated.

The term "interlayer cation" and "interlayer lithium" is used herein to refer to the exchangeable cations found at the interstitial locations where mica and vermiculite typically have exchangeable cations. These exchangeable interlayer cations are located between mica or vermiculite layers which are typically and characteristically well ordered and uniformly fitting together. In delaminated mica and vermiculite, the layers have been pushed apart with exchange cations and then even separated by shearing and agitation. Exchangeable cations in exposed surface locations are included in the term "interlayer cation"; this term, therefore, does not refer solely to the instances where such exchangeable cations or the dimethylacetamide-lithium group is literally between silicate layers.

The instant dimethylacetamide-lithium mica and dimethylacetamide-lithium vermiculite can, advantageously, be dispersed in a variety of liquid solvent systems which even the lithium vermiculite or the lithium mica could not be dispersed in. This ability to make dispersed mica and vermiculite in different solvent systems is particularly valuable when combining the mica and vermiculite with other materials which have a particular affinity for the liquid solvent system used. Avenues are thus opened to new combinations and compositions by using the instant invention.

DETAILED DESCRIPTION

The procedure used to prepare the instant compositions requires material selected from lithium mica and lithium vermiculite.

Lithium mica and lithium vermiculite can be purchased or prepared using ion exchange methods. Such methods are well known in the art. According to this preparation, lithium cations are placed in the silicate by contacting the selected silicate with a solution of a lithium salt. Lithium is introduced by ion exchange with exchangeable cations. Suitable references which describe lithium mica or lithium vermiculite and/or which indicate methods suitable for their preparation are U.S. Pat. Nos. 4,045,241; 3,434,917; and 3,936,383.

The layered phyllosilicate used can be either a natural or synthetic material. To prepare the instant compositions, the critical factor is that the selected phyllosilicate mineral must have lithium interlayer cations. To prepare the instant compositions, a material selected from lithium mica and lithium vermiculite is contacted with dimethylacetamide.

This can be done easily by combining the lithium silicate with an amount of dimethylacetamide (DMAC) which is effective to at least wet most of the platelets of the selected lithium phyllosilicate material. Most preferably, the dimethylacetamide is mixed with the selected silicate by itself. Alternatively, they can be mixed in a suitable liquid solvent system. This liquid solvent system can be selected from any solvent with which dimethylacetamide will form a single phase; so that the liquid solvent system will act as a carrier for the dimethylacetamide, allowing it to contact the mica and vermiculite platelets, and in so doing, complex with interlayer lithium to form the instant composition. When the end product desired is a suspension, the solvent liquid selected for the suspension can be the solvent in which the dimethylacetamide lithium-complexed mica and vermiculite is prepared. Benzyl alcohol, for example, is an excellent selection. A single step preparation of the mica and vermiculite suspension is done by contacting the lithium mica and lithium vermiculite with the dimethylacetamide in a selected liquid solvent system while adding heat, and preferably even agitation.

When dimethylacetamide contacts the lithium silicate, the lithium will become complexed with the dimethylacetamide. Formation of the complex is indicated by the swelling of the phyllosilicate layers. This swelling can be noted visually. The resulting lithium-complexed mica and vermiculite can then be drained free of the liquid and stored or used, for example, in combination with other materials, or alternatively, a suspension can be prepared by dispersing the dimethylacetamide-lithium complexed mica and vermiculite in a suitable liquid system.

To prepare a suspension with the instant DMAC-lithium complexed compositions, the liquid system for the suspension can acceptably be a solvent selected from the group consisting of: water, alcohol, ether, acetone, dimethylformamide, pyrrole, methyl-pyrrole, pyrrolidine, methyl-pyrrolidine, pyrrolidone, DMAC and methyl-pyrrolidone. Preferred solvents are selected from water, methanol, ethanol, isopropanol, benzyl alcohol, methyl pyrrolidone, and dimethyl formamide. Alcohol can be preferably selected from methanol, ethanol, propanol, isopropanol, and benzyl alcohol, When preparing the instant dimethylacetamide lithium complexed mica and vermiculite, it is preferred to use mica and vermiculite having a high surface area. Having a high surfaced area mica and vermiculite mineral will allow faster, easier, and more complete complexation. High surface area (small platelet) mica and vermiculite are also much easier to prepare a suspension with. One may, therefore, desire to use shearing, agitation, or grinding to comminute the mica and vermiculite before or during contact with the dimethylacetamide. In addition to the high surface area, using heat and using agitation will also speed lithium-dimethylacetamide complexation.

Comminution of the mica and vermiculite could also be preferred if the end use requires or prefers very fine mica and vermiculite platelets. For example, suspensions or other uses can require that at least about 90% by weight of the platelets of less than about 50 or even less than about 25 microns in diameter. The desired silicate surface area is thus influenced by the intended use of the complexed product. Some uses, for example, would prefer thin, wide platelets that are produced by shearing with little or no grinding. In other cases, the preferred material will have platelets with a large size distribution (not uniform) in which case comminution would be minimized. When the lithium vermiculite and mica has a lower surface area contact between the platelets and the dimethylacetamide is preferably permitted for a longer period of time.

The lithium mica and lithium vermiculite to be used for the instant invention can be selected in any available desired size. Preferred material will have at least about 95% by weight of its platelets less than 250 microns in diameter: more preferred material has at least about 95% by weight of its platelets less than 100 microns in diameter High aspect ratios (the ratio of plate diameter to thickness) are also frequently desired. Although aspect ratios can acceptably be as low as 10:1, preferably, the aspect ratio is at least about 30:1; more preferably, the average aspect ratio would range from about 50:1 to about 1,000:1.

Lithium mica and lithium vermiculite preferably can be combined with an effective amount of DMAC to complex about 25 percent or more of the interlayer lithium in order to get a silicate composition more easily used with non-aqueous compositions and systems that are not completely aqueous. The instant compositions that have a higher level of complexation can more easily be dispersed in the non-aqueous liquid systems. When a partially or completely aqueous suspension is desired, however, a lower level of lithium-dimethylacetamide complexation could permissively be used (even 4% lithium complexation), unless, of course, the intended use of the aqueous suspension requires higher levels. When, for example, the instant dimethylacetamidelithium phyllosilicate compositions are to be combined with other materials such as a coating composition like latex, one might prefer a more complete complexation. The desired chelation level of the interlayer lithium will thus depend on the end use. Acceptably, the chelation level can complex a minimum of about 4% of the exchangeable (interlayer) lithium, broadly ranging in a lithium chealation level of from about 4 to about 98% or more (to 100). Compatibility with non-aqueous material, however, is better at the higher lithium chealation levels. One might prefer to have a minimum of about 20% of the interlayer lithium chelated, or even a minimum of about 85% of the exchangeable lithium chealated with DMAC. Most preferably, for the more versatile compositions which can easily be interchangeably utilized with both aqueous and non-aqueous materials, a minimum of about 45% of the interlayer lithium will be chealated by DMAC. Preferably, availale interlayer lithium is complexed by contacting the selected lithium phyllosilicate with an excess of DMAC; and allowing the complexation reaction to go to completion.

Techniques are known in the art which can acertain the cation exchange capacity and the amount of interlayer lithium that is in the silicate. The instant invention can be used to complex even small amounts of lithium available. Preferably, however, the instant invention is used with mica and vermiculite that have lithium in at least about 20% of the interstitial cationic sites that are available with the particular material's cation exchange capacity.

The amount of dimethylacetamide used can be as low as about 5% by weight of the selected mica and vermiculite material. Preferably, the dimethylacetamide will be used in an amount of from about 15 to about 100 parts by weight per 100 parts of the selected lithium mica and lithium vermiculite.

A suitable practice is to make available at least enough dimethylacetamide for at least a single layer of dimethylacetamide over the surface of each layer of the lithium phyllosilicate. This will provide more than enough dimethylacetamide to complex the interlayer lithium. An even simpler practice, however, is to use enough dimethylacetamide to completely cover the selected lithium phyllosilicate material. The excess DMAC can be used as a solvent. Either of these practices can be followed with or without a liquid solvent carrier system for the dimethylacetamide. Preferably, a sheared or agitated slurry is used for complexation.

The lithium mica and vermiculite should be permitted to contact the dimethylacetamide for a sufficient length of time to allow the dimethylacetamide to complex with the lithium, or a length of time effective to allow the layers to swell. Layer sWelling is indicative of complexation, and of a dispersable material. The length of time suitable for a particular case will depend on factors such as silicate surface area, temperature, the amount of DMAC used, and the use of agitation. Acceptably, contact is allowed for a minimum of about one hour or a minimum of 20 minutes at temperatures over 60° C. Preferably, in order to speed complexation one or more of the following is used while contacting the selected lithium silicate with the dimethylacetamide: (a) heat under a pressure of from 1 atmosphere to about 25 atmospheres; (b) agitation; (c) using a liquid contacting system that is at least 85% by weight dimethylacetamide.

If the preparation method is used with either a limited amount of dimethylacetamide, or with a liquid carrier for the dimethylacetamide, it may be desirable to allow a greater length of time for the complexation reaction to occur. Preferably, the dimethylacetamide will be permitted to contact the selected lithium vermiculite and mica for a minimum of about three hours. Preferably, for a time in the range of from three hours (hrs.) to about 50 hrs. Suitably, the complexation reaction can be conducted at a temperature in the range of from about 20 to about 165° C. without added pressure. If desired, pressure can be increased as needed to complex at temperatures higher than 165° C. Preferably then, for a faster complexation, the lithium mica and vermiculite will be reacted with the dimethylacetamide at a higher temperature, in the range of from about 20 to about 250° C., and most preferably, from about 60 to about 250° C. with a pressure in the range of from atmosphere to about 30 atmospheres.

Suspensions of mica and vermiculite are usually made by combining a suitable liquid and shearing the mica and vermiculite in it. In many cases, such as when large platelets are used, or to improve stability, a dispersing agent or surfactant is used to help in the dispersion. Although the instant compositions form stable suspensions without them, dispersing agents or surfactants could also be used. Dispersing agents or surfactants are useful to increase the stability of the suspensions and extend their shelf time.

It has been noted that non-aqueous solvent suspensions of the instant DMAC-lithium compositions frequently tend to have much lower viscosities. High solids content suspensions could therefore be formed and processed using non-aqueous solvents (such as the alcohol, DMAC, etc.) and the dimethylacetamide mica or vermiculite without being hindered by high viscosities. Advantageously, high density films, fibers and paper could be formed. High solids suspensions, furthermore, would not lose as much thickness during drying.

The instant compositions can be made into suspensions and/or combined with other materials such as polymers, fibers, and binders. The suspensions of such combinations can be flocculated, if desired, and paper formed. The instant compositions, with or without such other materials can also be molded, made or drawn into an article or a film. Such articles or films, made from suspensions can also be flocculated, if desired, by ion exchange. These films or sheets can be dried and used or they can be laminated together to get boards and composites. Acceptably, the suspensions can have a viscosity in the range of from about 400 to about 3,800 cps.

The following examples are offered to illustrate the instant invention and thus should not be taken to limit it. All parts and percentages are by weight unless otherwise indicated.

EXAMPLE 1

Lithium fluorohectorite (LiFH) powder (purchased from Corning) was combined with enough N,N dimethylacetamide (DMAC) to cover the LiFH powder completely, leaving a small quantity of excess liquid. This mixture was subjected to sonic shearing and agitation using a Sonics and Materials Vibra Cell sonifier (Watts Bonding level 50-100) for approximately ½ hour. Visual inspection could not detect swelling, but, after the mixture sat for two days swelling at room (ambient) temperatures swelling was noted. The DMAC was drained.

The DMAC-lithium complexed fluorohectorite, in three approximately equal portions, was then combined with dimethylformamide (DMF), methanol, and acetone and agitated using the sonifier to form three separate suspensions.

EXAMPLE 2

Ten grams of the LiFH which had particle sizes less than 250 microns was added to 40 grams of DMAC and mixed for 30 minutes. Some swelling was observed, and a small amount was dispersed in the DMAC. The mixture was then transferred to a round bottom flask and refluxed for five hours. After one hour, substantial swelling and dispersion was observed.

The DMAC was drained, and the DMAC-lithium fluorohectorite was used to make stable suspensions in the following solvents: DMF, ethanol, methanol, acetone, isopropanol, and benzyl alcohol.

A quantity of the dimethylacetamide-lithium fluorhectorite composition thus prepared was also subjected to x-ray defraction analysis. The Basal spacings were found to be 18 angstroms (I=100).

EXAMPLE 3

A DMAC and LIFH mixture was refluxed for five hours. The resultant fluorohectorite material was collected. It was then used to form a stable dispersion in methyl-pyrrolidone (M-Pyrole). The DMAC/LiFH dispersion in M-Pyrole was cast onto a glass plate and allowed to dry. A coherent film resulted which indicated of a very high degree of dispersion in the solvent.

EXAMPLE 4

Dimethylacetamide-lithium fluorhectorite was prepared as described in Example 1, and was then dispersed in water. An aqueous flocculating solution of guanidinium hydrochloride was then added to this aqueous suspension. Immediate flocculation occurred.

The fact that immediate flocculation occurred shows that flocs can be prepared with the instant compositions and that the instant compositions can be used to prepare papers, boards, films, etc. and all of the other compositions which flocculated mica and vermiculite are also used for.

As this example indicates, the instant dimethylacetamide-lithium mica and vermiculite is also waterswelling and water dispersable.

Methods for preparing flocs, described in U.S. Pat. No. 4,707,298, are very suitably used with the instant compositions.

EXAMPLE 5

As described in Example 2, quantities of the 250 micron (sieved at 250 microns so that the particles were less than 250 microns) lithium fluorhectorite were refluxed with dimethylacetamide and then was combined with a number of solvents. The combinations are evaluated by noting swelling and dispersion (suspension) formation in the chart below. No surfactants were used.

TABLE 1

| Solvent | Dielectric Constent of Solvent | Evaluation |
| --- | --- | --- |
| Methanol | 32.7 | Stable Dispersion |
| Ethanol | 24.6 | Stable Dispersion |
| Isopropylalcohol | 19.92 | Stable Dispersion |
| Methylethyl ketone | — | Swelling of mica layers was noted. |

TABLE 1-continued

| Solvent | Dielectric Constent of Solvent | Evaluation |
|---|---|---|
| Toluene | 2.38 | Some swelling of mica layers was noted. |
| Xylene | | Some swelling of mica layers was noted. |
| Tetrahydrafuran | 66.0 | Swelling of the mica layers was noted. |
| Hexane | 1.89 | The mica formed a film on the bottom of the beaker |
| Acetone | 20.7 | Swelling was noted and a dispersion formed that was at least partially stable |
| Benzylalcohol | 13.1 | An excellent dispersion was formed. |

Swelling of the layers in the solvents is necessary to form a suspension.

It is interesting to note that the benzylalcohol not only formed a dispersion but an excellent one. The mica, furthermore, in the benzylalcohol took on a very translucent appearance. The dimethylacetamidelithium mica dispersions in the benzylalcohol thus have an unusual visual properties in addition to forming excellent suspensions. Furthermore, it can be speculated that since the vermiculite is usually very dark in color, the normal visual properties might be toned down by using dimethylacetamide-lithium vermiculite suspended in benzylalcohol.

Formation of a distinct mica, DMAC-lithium complexed composition is indicated by the swelling of the mica layers, in new solvents; this in itself is a distinct change in the mica. The new DMAC-lithium fluorohectorite, moreover, does disperse in solvents such as benzylalcohol without the use of any dispersing agent: lithium fluorohectorite, however, will not.

What is claimed is:

1. A composition comprising:
   a layered silicate selected from the group consisting of mica and vermiculite wherein the said layered silicate further has dimethylacetamidelithium chelation complexes at interlayer cationic sites.

2. A composition as described in claim 1 wherein the layered silicate is at least about 95% by weight in platelets which are less than 250 microns in diameter.

3. A composition as described in claim 1 wherein the layered silicate has an average aspect ratio in the range of from about 60:1 to about 1,000:1.

4. A composition comprising: platelets of a layered silicate selected from the group consisting of mica and vermiculite wherein the said silicate further has dimethylacetamide-lithium chelation complexes at interlayer cationic sites, and wherein the platelets are in a liquid.

5. A composition as described in claim 4 which also contains a dispersing agent.

6. A composition as described in claim 4 wherein the liquid is a solvent selected from the group consisting of water, alcohol, ether, acetone, dimethylformamide, pyrrole, methyl-pyrrole, pyrrolidine, methylpyrrolidine, pyrrolidone, dimethylacetamide and methyl-pyrrolidone.

7. A composition as described in claim 4 wherein the liquid is a solvent selected from water, methanol ethanol, isopropanol, benzylalcohol methylpyrrolidone, and dimethylformamide.

8. A composition as described in claim 4 wherein the selected mica and vermiculite is at least about 95% by weight in platelets which are less than 100 microns in diameter 9. A process comprising contacting a layered silicate material selected from the group consisting of: (1) mica which has exchangeable interlayer lithium cations and (2) vermiculite which has exchangeable interlayer lithium cations, with dimethylacetamide so that the interlayer lithium reacts with the diemthylacetamide to form dimethylacetamide-lithium chelation complexes in the layered silicate material.

10. A process as described in claim 9 wherein the dimethylacetamide and the layered silicate are contacted at a temperature in the range of from about 20 to about 165° C.

11. A process as described in claim 9 wherein, the dimethylacetamide and the selected layered silicate are refluxed together for a period of time effective to obtain swelling of layers in the layered silicate material.

12. A process as described in claim 9 wherein the dimethylacetamide and the layered silicate are contacted at a temperature in the range of from about 20 to about 250° C. under a pressure of from about one to about 30 atmospheres.

13. A process as described in claim 9 wherein the layered silicate and the dimethylacetamide were contacted in a liquid system that was miscible with the dimethylacetamide.

14. A process as described in claim 12 wherein the layered silicate and the dimethylacetamide were contacted in a liquid system that was miscible with the dimethylacetamide.

15. A process as described in claim 13 wherein the liquid system is a solvent selected from the group consisting of water, alcohol, ether, acetone, dimethylformamide, pyrrole, methyl-pyrrole, pyrrolidine, methylpyrrolidine, pyrrolidone, and methyl-pyrrolidone.

16. A process as described in claim 9 wherein the layered silicate is at least about 95% by weight in platelets that are less than 250 microns in diameter 17. A process as described in claim 9 wherein the layered silicate has an average aspect ratio in the range of from about 50:1 to about 1000:1.

18. A process as described in claim 14 wherein the liquid system is a solvent selected from the group consisting of water, alcohol, ether, acetone, dimethylformamide, pyrrole, methyl-pyrrole, pyrrolidine, methylpyrrolidine, pyrrolidone, and methyl-pyrrolidone.

* * * * *

UNITED STATES PATENT AND TRADEMARK OFFICE
CERTIFICATE OF CORRECTION

PATENT NO. : 4,956,121
DATED : September 11, 1990
INVENTOR(S) : Thomas M. Tymon et al It is certified that error appears in the above-identified patent and that said Letters Patent is hereby corrected as shown below:

In the Specification, in column 1, line 16, "3,328,340" should read --3,325,340--; in column 4, line 14, "85%" should read --35%--; and in column 5, line 18, the number "1" should be inserted before the word atmosphere.

In the Claims, claim 3 at column 7, line 50, "60:1" should read --50:1--.

Signed and Sealed this

Tenth Day of December, 1991

Attest:

HARRY F. MANBECK, JR.

*Attesting Officer*     *Commissioner of Patents and Trademarks*